United States Patent [19]

Stephens

[11] Patent Number: 4,500,701

[45] Date of Patent: Feb. 19, 1985

[54] CO-POLYOXADIAZOLES BASED ON 5-T-BUTYLISOSPHTHALIC ACID

[75] Inventor: James R. Stephens, Naperville, Ill.

[73] Assignee: Standard Oil Company (Indiana), Chicago, Ill.

[21] Appl. No.: 563,294

[22] Filed: Dec. 19, 1983

Related U.S. Application Data

[63] Continuation-in-part of Ser. No. 424,607, Sep. 27, 1982, abandoned.

[51] Int. Cl.³ .............................................. C08G 73/08
[52] U.S. Cl. .................................. 528/363; 428/411.1
[58] Field of Search ......................................... 528/363

[56] References Cited

U.S. PATENT DOCUMENTS

| | | | |
|---|---|---|---|
| 3,607,810 | 9/1971 | Schopf et al. | 528/363 |
| 3,642,707 | 2/1972 | Frazer | 528/363 |
| 3,734,893 | 5/1973 | Inventa | 528/363 |

*Primary Examiner*—Harold D. Anderson
*Attorney, Agent, or Firm*—Gunar J. Blumberg; William T. McClain; William H. Magidson

[57] ABSTRACT

Co-polyoxadiazoles prepared from 5-t-butylisophthalic acid and common organic diacids are disclosed. They are useful as fibers, films, coatings, felts, laminates and molded objects.

42 Claims, No Drawings

CO-POLYOXADIAZOLES BASED ON 5-T-BUTYLISOSPHTHALIC ACID

BACKGROUND OF THE INVENTION

This application is a continuation-in-part application of patent application Ser. No. 424,607 filed Sept. 27, 1982, now abandoned.

FIELD OF THE INVENTION

The field of this invention relates to novel copolyoxadiazoles (Co-POD's) most of which are soluble in organic solvents such as m-cresol and useful as coatings, molded objects, films and fibers.

In the prior art, the article by Y. Iwakura, et al., in *The Journal of Polymer Science (A)* 3, page 45 (1965), a method for the synthesis of polyoxadiazoles from hydrazine sulfate and simple diacids, such as terephthalic acid is disclosed. Other prior art references include the article by R. S. Jones, et al., in *The Journal of Applied Polymer Science*, Vol. 25, pages 315–321 (1980), British Patent Specification No. 1,455,776; Canadian Pat. No. 882,785 and the article by S. K. Varma, et al., in *The Journal of Applied Polymer Science*, Vol. 26, pages 571–577 (1981) and U.S. Pat. No. 3,238,183.

The following Japanese patents further illustrate the prior art: J79,029,509-B42; J79,034,732-B47; J80,027,918-C34 and J50,037,778-W28.

None of the foregoing references contemplates polyoxadiazoles soluble in m-cresol and useful as coatings, molded objects and films. In the book *Thermally Stable Polymers* by P. E. Cassidy; Marcel Dekker, Inc., New York, 1980, p. 188, the author states that "fully aromatic polyoxadiazoles are soluble only in strong acids, such as concentrated sulfuric or trifluoroacetic acid."

An object of this invention is to provide copolyoxadiazoles from 5-t-butylisophthalic acid (5-tBIA), when co-reacted with either terephthalic acid or isophthalic acid or a mixture of terephthalic acid and isophthalic acid, together with hydrazine sulfate. A further object is to provide molded objects, coatings, films, felts and fibers from the aforementioned copolyoxadiazoles.

I have found that the novel Co-POD's can be prepared by reacting 5-t-butylisophthalic acid with terephthalic acid or isophthalic acid or a mixture of both, with hydrazine sulfate, utilizing fuming sulfuric acid as the participating reaction medium.

The reaction is conducted at a temperature of about 25° to about 250° C. The Co-POD's have an inherent viscosity measured in sulfuric acid at 25° C. at about 2.0 and higher preferably about 2.1 to about 6.0 units.

The novel Co-POD's comprise the following repeating structure:

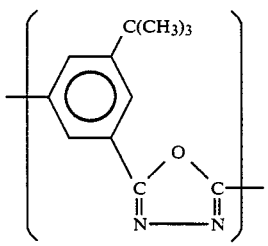

(A)

copolymerized with one or both of the moieties of the following repeating structures:

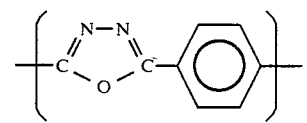

(B)

and/or

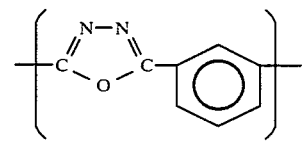

(C)

The suitable Co-POD's comprise ABC units, AB units or AC units. The mole ratio of A to B units or A to C units or A to a mixture of B and C units can vary from about 1:99 to about 99:1. The mole ratio of B to C units in a Co-POD comprised of ABC units is about 1:99 to about 99:1.

The novel Co-POD's wherein A units comprise about 50% or more of the total units are soluble in m-cresol and are useful in fiber, film, coating and molding applications. They can also be utilized as felts.

It is important that the carboxylic acids do not sulfonate or are not degraded by oleum or fuming sulfuric acid where that solvent is used as the reaction medium.

The novel Co-POD's have excellent thermal properties and can be molded into useful articles, case into films and coatings, or spun into fibers.

Fibers can be manufactured from the copolymers in the following manner: The reaction solution, after completion of the polycondensation of the hydrazine sulfate with the appropriate diacids, is cooled and mixed with sulfuric acid until a solution with the required viscosity is formed. The mixture is homogenized with stirring, and the resulting solution is filtered through an acid-proof fabric and deaerated under vacuum. The resulting spinning solution is formed into fibers using about a 0 to 55 percent aqueous solution of sulfuric acid as spinning batch. Non-washed, freshly formed fibers are oriented by stretching, for example, in air, or in a bath of about 0 to about 70 percent, aqueous sulfuric acid, then washed with water to remove the sulfuric acid and dried. A useful fiber spinning method is disclosed by R. S. Jones, et al., *The Journal of Applied Polymer Science*, Vol. 25, 315–321 (1980).

The polymerization reactions can be carried out in fuming sulfuric acid or polyphosphoric acid. The following examples illustrate the preferred embodiment of the invention. It will be understood that the examples are for illustrative purposes only and do not purport to be wholly definitive with respect to conditions or scope of the invention.

FILM PREPARATION

Most of the Co-POD's could be dissolved in m-cresol at 15 percent solids content, spread on glass or steel plates at ca. 5 mil wet thickness, then baked at 316° C. in a circulating air oven for 10 minutes. The resultant films were inspected—all tested were tough and integral.

EXAMPLE 1

Forty grams of fuming sulfuric acid (30% SO₃) were added to a dry mixture of 4.08 g of 5-t-butylisophthalic acid, 1.02 g of terephthalic acid and 3.99 g of hydrazine sulfate. The mixture was stirred and heated in an oil bath controlled at 150° C. for 30 minutes. Complete solution and a viscosity rise occurred in 10 minutes from the start of heating. The reactor contents were then added to a 750 ml mixture of ice and water in a home blender and agitated for about 1 minute. The aqueous solution was poured off and the precipitated polymer was reagitated one minute with 500 ml of fresh water. The polymer was filtered and then washed slowly with several portions of distilled water until the pH of the effluent wash water was 5. It was air-dried on the filter and then dried in vacuum at 130° C. to constant weight.

The inherent viscosity of the polymer at a conc. of 0.5 g/deciliter in 100% sulfuric acid was determined using a Cannon-Fenske viscometer at 25° C. according to the procedure outlined in the text *Preparation Methods of Polymer Chemistry* by W. R. Sorenson and T. W. Campbell, 2nd Ed., John Wiley and Sons Inc. 1968 p 44. The $[\eta]_{0.5}$ was 3.7.

The glass transistion temperature ($T_g$) was determined using the Differential Scanning Calorimetry method. It was 343° C.

EXAMPLE 2

In a manner identical to the above example, 2.04 g of isophthalic acid and 2.72 g of 5-t-butylisophthalic acid were reacted with 3.99 g of hydrazine sulfate in oleum and processed as above to yield 3.5 g of polymer of $[\eta]_{0.5}$ $H_2SO_4$ of 3.7 and $T_g=306°$ C. A 5% solution of this polymer was highly swollen but did not give complete solution in m-cresol in 10 days; however a 2% solution was completely soluble in 2 days.

EXAMPLE 3

In a similar manner, a co-polyoxadiazole was prepared from 2.04 g of terephthalic acid and 2.72 g of 5-t-butylisophthalic acid. Its $[\eta]_{0.5}$ $H_2SO_4$ was 3.6. Its $T_g$ was 350° C. It is highly swollen by m-cresol and probably soluble but after 2 weeks of slow tumbling at 2% conc. was not completely soluble.

EXAMPLE 4

In a similar manner, a co-polyoxadiazole was prepared from 2.272 g of 5-t-butylisophthalic acid, 1.22 g of isopathalic acid, and 0.81 g of terephalic acid. Its $[\eta]_{0.5}$ $H_2SO_4$ was 4.1. Its $T_g$ was 327° C. It was easily soluble in m-cresol.

The above examples are tabulated in Table 1 as well as other experimental runs. In the examples wherein A units comprise about 50% or more of the total units these Co-POD's are in m-cresol with inherent viscosities measured in 100% sulfuric acid at 25° C. of about 3.5 or higher.

EXAMPLE 5

Thin Films from a Copolyoxadiazole

Twenty grams of the (copolyoxadiazole derived from 3 moles of 5-t-butylisophthalic and 1 mole of terephthalic acid) were added to 200 g. of m-cresol with stirring. After 24 hours of intermittent mixing a clear solution was obtained with a viscosity of 25 stokes (Gardner viscosity). A ca. one gram solution of this material was applied to a 6"×6" glass plate and spread using a wire-wound rod as a "doctor blade." The thin wet film was baked for 35 minutes at 250° C. in a circulating air oven to remove the solvent. The solventless film was removed from the plate using a hot water soak and razor blade. It was clear, colorless, and could be handled readily. Its thickness, measured by infra-red spectroscopy utilizing Beer's Law and the intensity of the absorbance at 1235 cm$^{-1}$, was 0.1 mil or 2.5 $\mu$m (millionth of a meter) when the doctor blade rod used was wound with wire of 9 mil diameter. Using 14 and 3 mil wire windings and the same technology, we calculate by extrapolation that the 3 mil rod gave a dry film of 1.3 $\mu$m ±20%. This film was too thin for conventional handling and more exacting measurements.

In an additional experiment it was found that the above 0.1 mil film remained integral with no change in morphology when heated at 160° C. under pressure with 500 g. of water. In the same vessel under the same conditions a 1.0 mil film of a commercial high-temperature use rated polyamide-imide (TORLON-4000)* dissolved in the massive amount of water.

*Trademark of Amoco Chemicals Corporation

TABLE 1

Solubility of Co—POD's in M—Cresol, Inherent Viscosities, and Glass Transition Temperatures Per Molar Composition of Aromatic Diacids

| Example | Aromatic Diacid Composition in Molar % | | | $\eta 0.5$ $H_2SO_4$ | Solubility in m-cresol @ 2% solids | $T_g$, °C. |
|---|---|---|---|---|---|---|
| | 5-tBIA | TA | IA | | | |
| | 100 | — | — | 4.3 | yes | nt |
| | — | 100 | — | 3.54 | no | nt |
| 2 | 50 | — | 50 | 3.7 | yes | 306 |
| | 37.5 | — | 62.5 | 2.3 | no | 310 |
| | 25 | — | 75 | 2.6 | no | 306 |
| | 33⅓ | 33⅓ | 33⅓ | 3.1 | no | 336 |
| 3 | 50 | 50 | — | 3.6 | yes* | 350 |
| 1 | 75 | 25 | — | 3.7 | yes | 343 |
| | 25 | 75 | — | 3.5 | no | 382 |
| | — | 40 | 60 | 3.1 | no | 346 |
| 4 | 50 | 20 | 30 | 4.1 | yes | 327 |

TA = terephthalic acid
IA = isophthalic acid
5-tBIA = 5-t-butylisophthalic acid
nt = not tested
* = borderline case

I claim:

1. A moldable copolyoxadiazole comprising the following structure:

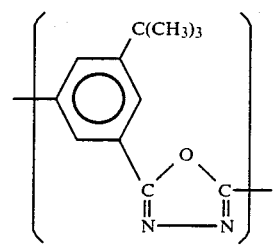

(A)

and

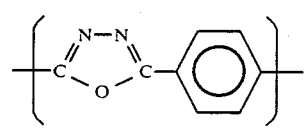

(B)

and

-continued

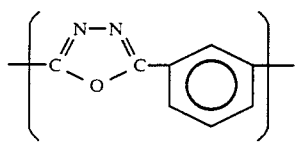
(C)

wherein the ratio A units to a mixture of B units and C units is about 1:99 to about 99:1 and the ratio of B units to C units is about 1:99 to about 99:1.

2. The copolyoxadiazole of claim 1 in the form of a molded object.

3. The copolyoxadiazole of claim 1 in the form of a fiber.

4. The copolyoxadiazole of claim 1 in the form of a film.

5. The copolyoxadiazole of claim 1 in the form of a coating.

6. The copolyoxadiazole of claim 1 in the form of a felt.

7. The copolyoxadiazole of claim 1 in the form of a laminate.

8. A moldable copolyoxadiazole comprising the following structure:

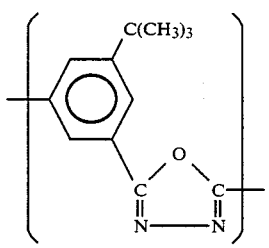
(A)

and

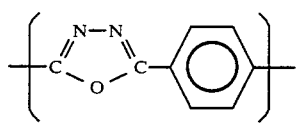
(B)

wherein the ratio of A units to B units is about 1:99 to about 99:1.

9. The copolyoxadiazole of claim 8 in the form of a molded object.

10. The copolyoxadiazole of claim 8 in the form of a fiber.

11. The copolyoxadiazole of claim 8 in the form of a film.

12. The copolyoxadiazole of claim 8 in the form of a coating.

13. The copolyoxadiazole of claim 8 in the form of a felt.

14. The copolyoxadiazole of claim 8 in the form of a laminate.

15. A moldable copolyoxadiazole comprising the following structure:

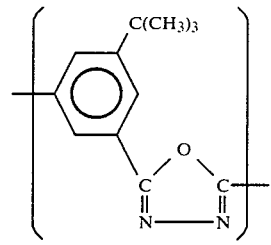
(A)

and

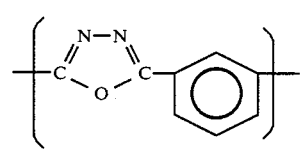
(C)

wherein the ratio of A units to C units is about 1:99 to about 99:1.

16. The copolyoxadiazole of claim 15 in the form of a moled object.

17. The copolyoxadiazole of claim 15 in the form of a fiber.

18. The copolyoxadiazole of claim 15 in the form of a film.

19. The copolyoxadiazole of claim 15 in the form of a coating.

20. The copolyoxadiazole of claim 15 in the form of a felt.

21. The copolyoxadiazole of claim 15 in the form of a laminate.

22. The copolyoxadiazole of claim 1 wherein the copolyoxadiazole has an inherent viscosity of about 2.1 to about 6.0 determined at a concentration of 0.5 grams per deciliter in 100% sulfuric acid at 25° C.

23. The copolyoxadiazole of claim 22 in the form of a molded object.

24. The copolyoxadiazole of claim 22 in the form of a fiber.

25. The copolyoxadiazole of claim 22 in the form of a film.

26. The copolyoxadiazole of claim 22 in the form of a coating.

27. The copolyoxadiazole of claim 22 in the form of a felt.

28. The copolyoxadiazole of claim 22 in the form of laminate.

29. The copolyoxadiazole of claim 8 wherein the copolyoxadiazole has an inherent viscosity of about 2.1 to about 6.0 determined at a concentration of 0.5 grams per deciliter in 100% sulfuric acid at 25° C.

30. The copolyoxadiazole of claim 29 in the form of a molded object.

31. The copolyoxadiazole of claim 29 in the form of a fiber.

32. The copolyoxadiazole of claim 29 in the form of a film.

33. The copolyoxadiazole of claim 29 in the form of a coating.

34. The copolyoxadiazole of claim 29 in the form of a felt.

35. The copolyoxadiazole of claim 29 in the form of a laminate.

36. The copolyoxadiazole of claim 15 wherein the copolyoxadiazole has an inherent viscosity of about 2.1 to about 6.0 determined at a concentration of 0.5 grams per deciliter in 100% sulfuric acid at 25° C.

37. The copolyoxadiazole of claim 36 in the form of a molded object.

38. The copolyoxadiazole of claim 36 in the form of a fiber.

39. The copolyoxadiazole of claim 36 in the form of a film.

40. The copolyoxadiazole of claim 36 in the form of a coating.

41. The copolyoxadiazole of claim 36 in the form of a felt.

42. The copolyoxadiazole of claim 36 in the form of a laminate.

* * * * *

UNITED STATES PATENT OFFICE
CERTIFICATE OF CORRECTION

Patent No. 4,500,701                        Dated February 19, 1985

Inventor(s) JAMES R. STEPHENS

It is certified that error appears in the above-identified patent and that said Letters Patent are hereby corrected as shown below:

| Column | Line | |
|---|---|---|
| 1 | 2 | "5-T-BUTYLISOSPHTHALIC" should be -- 5-T-BUTYLISOPHTHALIC -- |
| | | hydrazine sulfate -- |
| 2 | 31 | "case" should be -- cast -- |
| 6 | 25 | "moled" should be -- molded -- |

Signed and Sealed this

Fifteenth Day of October 1985

[SEAL]

Attest:

Attesting Officer

DONALD J. QUIGG

Commissioner of Patents and Trademarks—Designate